United States Patent [19]
Boyd et al.

[11] 3,876,819
[45] Apr. 8, 1975

[54] GROUNDING ROD

[75] Inventors: Gilbert D. Boyd; Robert R. Walker, both of Wallingford, Conn.

[73] Assignee: Allegheny Ludlum Industries, Inc., Pittsburgh, Pa.

[22] Filed: Aug. 22, 1974

[21] Appl. No.: 499,736

[52] U.S. Cl. .................. 174/7; 29/191.6; 29/196.1; 29/196.2
[51] Int. Cl. ............................................. H01r 3/06
[58] Field of Search ......... 174/7, 126 CP; 29/191.6, 29/193, 196.1, 196.2; 52/155, 727

[56] References Cited
UNITED STATES PATENTS
| | | | |
|---|---|---|---|
| 3,463,620 | 8/1969 | Winter | 29/191.6 X |
| 3,566,000 | 2/1971 | Maurer et al. | 174/7 |
| 3,716,649 | 2/1973 | Smith et al. | 174/7 |

FOREIGN PATENTS OR APPLICATIONS
| | | | |
|---|---|---|---|
| 250,812 | 4/1964 | Australia | 174/7 |
| 1,291,032 | 3/1962 | France | 174/7 |

Primary Examiner—Laramie E. Askin
Attorney, Agent, or Firm—Vincent G. Gioia; Robert F. Dropkin

[57] ABSTRACT

An electrical grounding rod comprising a central aluminum rod surrounded by and in intimate contact with a tubular strength member made of a material of substantially greater strength than aluminum such as plain carbon steel. A sheath made of a corrosion resistant conductive material such as stainless steel surrounds and is in intimate contact with the strength member.

9 Claims, 1 Drawing Figure

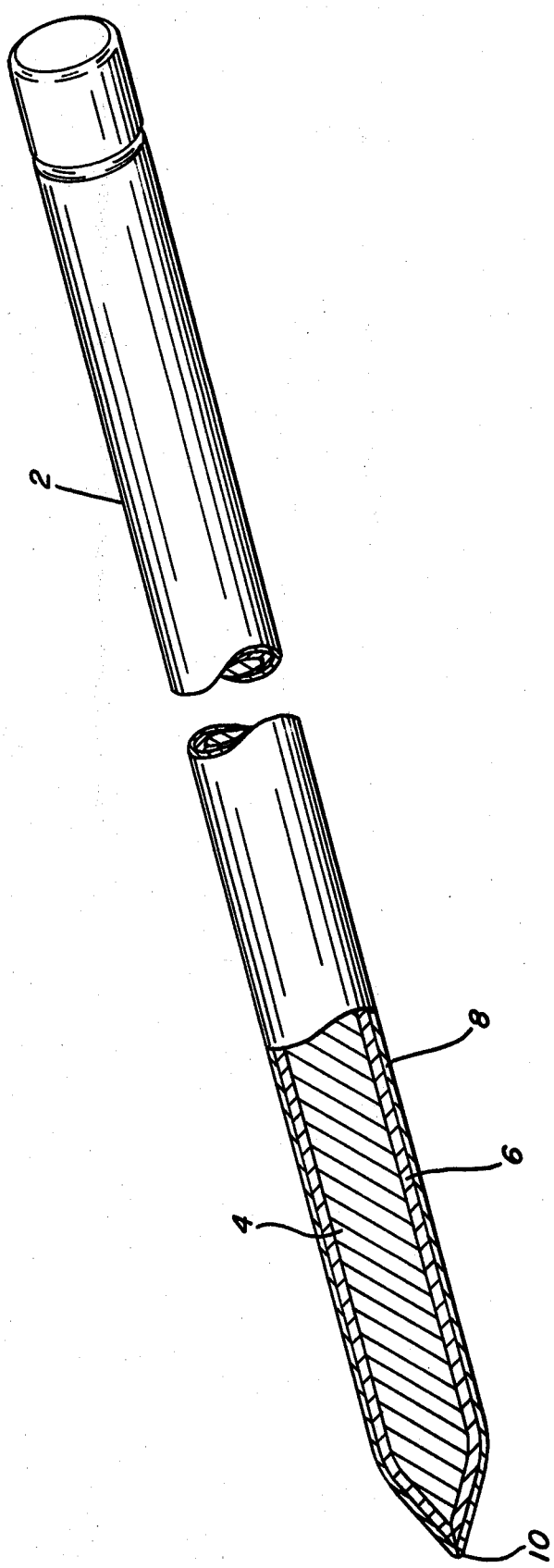

GROUNDING ROD

This invention relates to an electrical grounding rod particularly for use in the protection of buildings and equipment against electrical discharge, such as lightning and fault currents. Many patented and unpatented designs of grounding rods have been used for many years and are being used at the present time. Related patents of which we have knowledge are Smith et al, U.S. Pat. No. 3,716,649 dated Feb. 13, 1973; Maurer et al U.S. Pat. No. 3,566,000 dated Feb. 23, 1971; Staples U.S. Pat. No. 2,207,134 dated July 9, 1940; Haig U.S. Pat. No. 2,068,545 dated Jan. 19, 1937, and Australian Pat. No. 250,812 Published May 2, 1963. All of the previous rods of which we have knowledge have various drawbacks. They may lack sufficient strength or rigidity to be driven into the ground, they may lack durability, their electrical conductivity may be poor, they may be heavy to handle and ship, and/or they may be expensive. The grounding rods of U.S. Pat. Nos. 3,566,000 and 3,716,649 referred to above have been unsatisfactory for some purposes such as for welding to a ground grid system because the plastic present therein flamed up and made the welding process dangerous and the weld unreliable. When driving the rod into the ground, it acts as a cantilever beam fixed at one end in the ground and the other end loaded with hammer blows. Thus, the greater the EI factor the less the deflection. For some reason it has been common practice in composite rods to place the more conductive but low strength material on the outside of the rod and the higher strength material toward the center. This utilizes the materials to obtain a low EI factor. We have found that we can place the lower strength material in the center without adversely affecting the conductivity of the rod while greatly increasing its stiffness. For example, if the same cross-sectional area of aluminum is used as a core, as in our invention, instead of as a tube having 0.567 inch outside diameter and a 0.103 inch wall and a carbon steel tube used around the aluminum core, rather than within an aluminum tube with the same cross-sectional area, the deflection per unit load would be only 1.58 inches as compared to 2.028 inches. Also the weight of an 8 ft. rod can be reduced more than a pound from rods of approximately equivalent electrical resistance and more than 2 pounds from rods of approximately the same stiffness but higher electrical resistance. We have also found that an aluminum tube sheathed by a carbon steel tube will corrode and will form a galvanic cell within itself and will be anodic to many metals in underground service. We have found that an aluminum rod sheathed by a strengthening member of carbon steel which in turn is sheathed by a corrosion resistant but conductive material does not form a galvanic cell within itself or readily with other buried metals, is resistant to underground corrosive attack, and can be readily brazed or fusion welded.

It is therefore an object of our invention to provide an electrical grounding rod which best utilizes its materials for maximum strength and/or electrical conductivity.

Another object is to provide such a grounding rod which is highly resistant to corrosion attack and does not readily form a galvanic cell.

Still another object is to provide such a grounding rod which is simple in construction and relatively inexpensive.

These and other objects will become apparent from the following description when taken in conjunction with the accompanying drawing in which the single FIGURE is a longitudinal view of the grounding rod with parts broken away and shown in section.

Referring more particularly to the drawings, reference numeral 2 indicates the grounding rod of our invention which includes a center aluminum rod 4 surrounded by and in intimate contact with a tubular strength member 6 made of a conductive material having substantially greater strength than aluminum. Plain carbon steel is preferred. Surrounding and in intimate contact with tube 6 is a corrosion resistant conductive sheath 8. This is preferably made of stainless steel such as Type 304 and has a substantially less wall thickness than tube 6. A driving point 10 may be attached to the rod in any usual manner or, as shown in the drawing, the point may be an integral part of the ground rod. In either case, the point is completely sheathed with stainless steel.

The tubes 6 and 8 may be drawn over the rod 4 in any well known manner by starting with a tube 6 of slightly larger inside diameter than rod 4 and slightly smaller outside diameter than the inside diameter of tube 8.

One particular rod 8 ft. long has a 0.437 in. solid aluminum rod, surrounded by a carbon steel tube having a 0.567 in. outside diameter and a 0.065 in. wall. A Type 304 stainless steel tube having a 0.625 outside diameter and a 0.029 in. wall surrounds the carbon steel tube. The rod has a resistance of 0.0006268 ohms and weighs 5 lbs. 11 ozs.

While one embodiment of this invention has been shown and described, various adaptations and modifications may be made without departing from the scope of the appended claims.

We claim:

1. An electrical grounding rod assembly comprising an aluminum rod, a tubular strength member surrounding and in intimate contact with said aluminum rod, said strength member being made of material having substantially greater strength than aluminum, and a tubular sheath surrounding and in intimate contact with said strength member, said sheath being made of a corrosion resistant conductive material.

2. An electrical grounding rod assembly according to claim 1 in which said strength member is made of carbon steel.

3. An electrical grounding rod assembly according to claim 1 in which said sheath is made of stainless steel.

4. An electrical grounding rod assembly according to claim 3 in which said strength member is made of carbon steel.

5. An electrical grounding rod assembly according to claim 1 in which the wall thickness of said sheath is substantially less than that of said tubular strength member.

6. An electrical grounding rod according to claim 5 in which said strength member is made of carbon steel.

7. An electrical grounding rod assembly according to claim 5 in which said sheath is made of stainless steel.

8. An electrical grounding rod assembly according to claim 7 in which said strength member is made of carbon steel.

9. An electrical grounding rod assembly according to claim 8 including a driving point at one end, said driving point being sheathed with stainless steel.

* * * * *